United States Patent [19]

Suzuki

[11] 3,996,618
[45] Dec. 7, 1976

[54] RETENTION DEVICE FOR CASSETTE TAPE RECORDER

[75] Inventor: Shoji Suzuki, Iwaki, Japan
[73] Assignee: Alps Motorola, Inc., Tokyo, Japan
[22] Filed: Jan. 2, 1975
[21] Appl. No.: 538,099

[30] Foreign Application Priority Data
Feb. 25, 1974 Japan .............................. 49-22638

[52] U.S. Cl. ............................... 360/96; 242/198; 360/93; 360/105
[51] Int. Cl.² ................. G11B 15/24; G11B 23/04; G11B 15/66
[58] Field of Search ............... 360/96, 93, 92, 105, 360/71; 242/198–201, 55.19 A

[56] References Cited
UNITED STATES PATENTS

| | | | |
|---|---|---|---|
| 3,495,835 | 2/1970 | Laa | 360/105 |
| 3,614,109 | 10/1971 | Yamamoto | 360/93 |
| 3,669,457 | 6/1972 | Nozawa | 360/93 |
| 3,752,488 | 8/1973 | Righi | 360/93 |
| 3,800,324 | 3/1974 | Nakamichi | 360/105 |
| 3,849,799 | 11/1974 | Nakamichi | 360/96 |
| 3,870,247 | 3/1975 | Carisey | 360/96 |
| 3,896,492 | 7/1975 | Socias | 360/93 |

*Primary Examiner*—Alfred H. Eddleman
*Attorney, Agent, or Firm*—Donald J. Lisa; James W. Gillman

[57] ABSTRACT

A retention device for a cassette tape recorder comprises a cassette holder, a platform, a movable plate, a slide plate and a retention lever. The cassette holder is adapted to receive a tape cassette and is movable vertically so that the tape cassette may be engaged and disengaged with the tape drive means. The platform supports magnetic transducer heads and a pinch roller and is slidable so as to cause the heads and pinch roller to come into engagement with the magnetic tape in the cassette. The movable plate is moved with the platform, when it is moved to engage the heads with the tape in the cassette.

The slide plate is slidably mounted on the movable plate, and a tension spring interconnects them; so that the slide plate is moved with the movable plate. The range of the movement of the slide plate is limited to be less than that of the movable plate. The retention lever is pivotally secured at one end on the slide plate, and a mid-point of the lever passes through a hole in the rear portion of the base of the cassette holder so that the other end of the lever may be rotated with respect to the holder. With the movement of the platform, the movable plate, and consequently the slide plate, the retention lever rotates to press the tape cassette firmly against the transducer heads and pinch roller.

7 Claims, 2 Drawing Figures

RETENTION DEVICE FOR CASSETTE TAPE RECORDER

BACKGROUND OF THE INVENTION

The present invention is in general directed to a novel and improved construction of tape recorder for magnetic sound tape in cassette, and more particularly to an improved retention device for the tape cassette.

Numerous drive means for tape recorders are already known. More recently, co-planar compact cassettes have been proposed for tape recorders in which the two spools, namely the supply spool and the take-up spool, are combined in a container housing, and such housing, together with the magnetic tape included therein, is placed on the recorder unit. The magnetic tape is well protected in these cassettes and is easy to handle. For these reasons, recorders utilizing cassettes have been very rapidly generally accepted.

Each cassette has openings only in one side of the housing for introducing the magnetic transducer heads and the pinch roller. In addition, the base of the cassette is provided with additional openings for introducing drive shafts or a capstan.

In tape recorders utilizing such cassettes, after the tape cassette is loaded in the recorder unit, the recorder is brought by suitable means into selected operative and inoperative conditions, namely recording, playback, fast-wind, fast-rewind and stop. In the operative conditions, the cassette must be firmly retained in the operative state in which the tape in the cassette is engaged with the tape drive means and the transducer head. Generally, the mechanisms which accomplish this have been relatively complex, and therefore expensive. Also, it is necessary to employ a mechanism which is not affected by mechanical shock.

SUMMARY OF THE INVENTION

Therefore, it is an object of this invention to provide a cassette tape recorder which is simple in its construction, reliable and simple to operate.

It is another object of this invention to provide an improved retention device for a tape cassette in a cassette recorder/player device.

It is a further object of this invention to provide an improved retention device for tape cassette which is applicable to a so-called "slot-in" type cassette recorder wherein the tape cassette is inserted laterally into the recorder unit as well as applicable to an ordinary type cassette recorder wherein the tape cassette is placed vertically into the recorder unit.

In accordance with a preferred embodiment of this invention, a retention device for a cassette is employed in a cassette recorder having a housing with a chassis. A cassette holder is located within the housing and includes a support surface for the cassette.

A slidable platform is located beneath the cassette on the chassis and magnetic transducer heads and a pinch roller are mounted on this platform which can be moved into engagement with the cassette in the cassette holder. A movable plate also is mounted on the chassis and is coupled for movement with the movement of the slidable platform. A retention lever is pivotally attached at one end to the movable plate and extends through a hole on the support surface of the cassette holder to a point above a cassette placed in the holder. As the slidable platform and the movable plate subsequently are moved relative to the cassette holder to cause the magnetic transducer heads and pinch roller to engage the tape in the cassette, the retention lever pivots against the opposite edge of the cassette to press it firmly against the transducer heads in the operating mode.

The novel features which are considered as characteristics of the present invention are set forth in particular in the appended claims. The improved cassette tape recorder of the present invention itself, however, both as to its construction and its mode of operation, together with additional features and advantages thereof, will be best understood upon perusal of the following detailed description of a specific embodiment with reference to the accompanying drawings in which:

DETAILED DESCRIPTION

Figure 1:
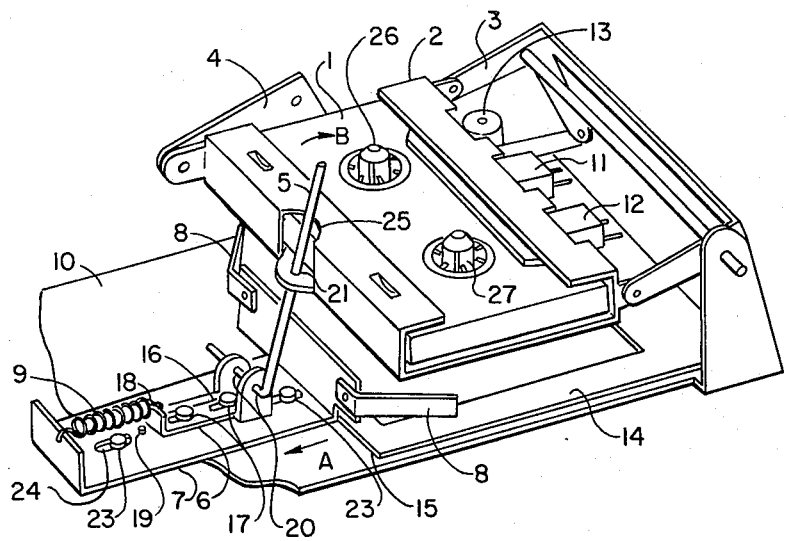
FIG. 1 is a perspective view illustrating a preferred embodiment of the invention.

Referring now to the drawing in FIG. 1, in which like reference numerals are used in both figures to denote the same components, a tape cassette 1 is shown in place in a cassette holder 2 which is adaped to shift the cassette 1 up and down in co-operation with levers 3 and 4 that are rotatably secured to a chassis 10 of a cassette tape recorder. (The term "recorder" covers cassette players as well as record/play devices.) A movable platform 14, on which magnetic transducer heads 11, 12, a pinch roller 13 and other elements necessary for recording and playback operation of the recorder are mounted, is slidably mounted on the chassis 10. When the push-button for recording or playback (not shown) is depressed, the platform 14 is moved in the direction of the arrow A to cause the heads 11, 12 and the pinch roller 13 to engage the magnetic tape in the cassette 1.

A movable plate 7 also is slidably mounted on the chassis 10 by supporting pins 23 attached to the chassis 10 opposite the rear edge 15 of the movable platform 14. A slide plate 6, having an upright extension 18 at its read end, is slidably mounted on the plate 7 by supporting pins 17 extending through slots (not shown) in the plate 7 and attached to the chassis 10. The slide plate 6 is pulled backward by a tension spring 9 suspended between the extension 18 of the slide plate 6 and a similar extension on the movable plate 7, with the extension 18 abutting against a pin 19 secured to the plate 7 in the ordinary state (the inoperable condition).

The movable plate 7 is permitted to move relative to the chassis 10 and the holder 2, within the limit defined by the length of slots 24. Similarly, the slide plate 6 is movable relative to the plate 7 within the limit defined by the length of slots 16. The slots 24 are longer than the slots 16.

An L-shaped retention lever 5 is pivotally held at one end by the holes 20 of a pair of upright extensions provided at the front end of the slide plate 6. The midpoint of the lever 5 passes through a hole 21 formed in a tongue extension on the rear of the base of the cassette holder 2; and the free end of the lever 5 enters an opening 25 made at the rear of the cassette holder 2. The L-shaped retention lever 5 is rotatable in the direction of the arrow B, with the hole 21 acting as a fulcrum; so that the free end of the lever 5 presses or releases the tape cassette 1.

Drive shafts 26 and 27 engage the supply reel and takeup reel, respectively, of the cassette 1 in a conventional manner, and indicate brake plates 8 control the rotation of the supply reel and take-up reel.

The operation of the embodiment disclosed above will now be described.

Figure 2:
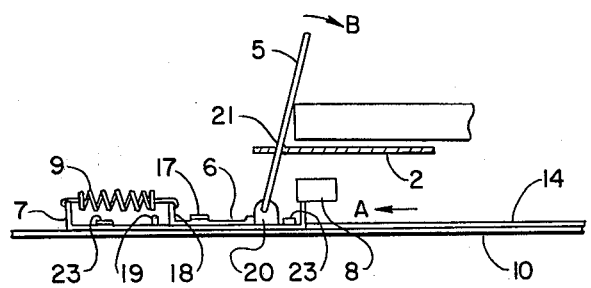
FIG. 2 is a cross-sectional view illustrating portions of the embodiment of FIG. 1.

The drawings in FIG. 1 and FIG. 2 illustrate the state of operation in which a tape cassette 1 is loaded in position for recording or playback modes of operation. Such condition is brought about by depressing a play button (not shown) after the tape cassette 1 is placed into the cassette holder 2. When the play button is depressed, the platform 14 is moved in the direction of the arrow A, and thus the magnetic transducer heads 11, 12 and the pinch roller 13 enter openings provided in the front end portion of the cassette 1 to come into contact with the magnetic tape. As the platform 14 moves in the direction of the arrow A, it collides with the movable plate 7 to cause the movable plate 7 to also move in the direction of the arrow A relative to the chassis 10 and cassette holder 2.

This movement of the movable plate 7 pulls the brake plate 8 apart from the supply and take-up reels (not shown) so that both of the reels may rotate freely. At the same time, the movement of the movable plate 7 causes the slide plate 6 to move backward by the action of the tension spring 9 holding the extension 18 against the pin 19. Consequently, the pivotally supported end of the L-shaped lever 5 is pulled backward, and the free end of the lever 5 rotates in the direction of the arrow B with respect to the hole 21 in the base of the holder 2. Thus, the lever 5 gradually pushes the rear of the tape cassette 1 forward as the movable plate 7 goes backward. As the platform 14 and the movable plate 7 continue to move back, the slide plate 6 moves backward until the forward end of the slots 16 engage the supporting pins 17. The slide plate 6 does not then move further. At this point, the lever 5 is pressed firmly against the tape cassette 1.

As the platform 14 proceeds to move still further, this time only the movable plate 7 shifts back. Although the tension force of the spring 9 becomes stronger by the movement of the movable plate 7 relative to the plate 6, the pressure of lever 5 on the cassette 1 is kept constant because of the immovability of the slide plate 6. Thus the platform 14 and the movable plate 7 continue to move until the transducer heads 11 and 12 and the pinch roller 13 come into positive contact with the magnetic tape in the cassette 1. Finally the platform 14 is latched to stop by a suitable locking means (not shown). Thus, the tape recorder is brought into its playback or recording state.

In order to release the tape recorder from the playback or recording state, a release button (not shown) is depressed. When this is done, the latching for the platform 14 is removed, the platform 7 and the movable plate 6 are returned to the right (as viewed in FIGS. 1 and 2), to their original positions by a return spring (not shown), and consequently the slide plate 6 is returned until the tab portion 18 thereof is blocked by the supporting pin 16. By the returning of the slide plate 6, the L-shaped retention lever 6 is rotated in the opposite direction to that of the arrow B to release the tape cassette 1 from the retained state. Thus, the L-shaped retention lever 5 presses the tape cassette only when the tape recorder is in a play or record mode.

From the foregoing, it is apparent that the tape cassette 1 is retained firmly with a constant pressure by the co-operation of the movable plate 7 with the slide plate 6. In the embodiment described above, though the L-shaped lever 5 is held on the slide plate 6, it may be possible to support the lever 5 on the movable plate 7 without utilizing the slide plate 6. The retention lever 5 also can be made of different shapes and material.

Although the present invention has been described with respect to a certain specific embodiment, it will be appreciated that modifications and changes may be made by those skilled in the art without departing from the true spirit and scope of the invention.

I claim:

1. A retention device for a cassette tape recorder having a chassis including in combination:
   a cassette holder mounted on the chassis of said recorder and located a predetermined distance above said chassis;
   a slidable platform on said chassis and on which at least a transducer head is mounted for movement therewith;
   a movable plate slidably mounted on said chassis and adapted to be moved by the movement of said slidable platform; and
   a retention lever means having a first end rotatably mounted on said movable plate, a mid-point captivated by said cassette holder and a free end located adjacent a cassette in said cassette holder for pressing such cassette firmly toward said magnetic transducer head in response to the moving of said slidable platform and said movable plate into a predetermined position.

2. The combination according to claim 1 wherein said movable plate comprises a first movable portion slidably mounted on said base and adapted to be moved by the movement of said slidable platform, and a second movable portion slidably mounted on said first movable portion with said one end of said retention lever being rotatably mounted on said second movable portion.

3. The combination according to claim 2 wherein said retention lever extends substantialy upwardly above said second movable portion and is pivotally mounted thereon at one end and wherein said cassette holder includes a cassette supporting surface having an extension adjacent one end thereof with an aperature therein, said retention lever extending through said aperature and extending thereabove a sufficient distance to engage the edge of a cassette placed in said cassette holder, said slidable platform and said movable plate adapted to be moved in a direction parallel to the support surface of said cassette holder, with said transducer head being located on the opposite side of said cassette holder from the side having said extension thereon; so that movement of said transducer head toward said cassette moves said movable plate away from said cassette to pivot said retention lever into said cassette to press it firmly toward said transducer head.

4. A cassette locking mechanism for a tape device adapted to receive a tape cassette and including a housing having a tape drive mechanism engageable with the cassette, with a transducer head positioned adjacent the tape in the cassette, the mechanism includng in combination:
   cassette holder means mounted in the housing in a position wherein tape drive mechanism is engageable with a cassette in said holder means, said holder means having a cassette support surface with a hole therethrough adjacent one edge;

platform means having the transducer head mounted thereon, said platform means being slidably movable in said housing between a first position free of the cassette holder means and a second position wherein said transducer head is engageable with an inserted cassette in said holder on the side opposite the hole in said support surface;

plate means slidably mounted in the housing and coupled with said platform means for movement thereby; and a locking lever pivotally mounted at one end on said plate means and passing through the hole in said cassette support surface adjacent a cassette in said cassette holder means, said movement of said platform means and said plate means from said first position to said second position causing said locking means to pivot about said one end thereof causing said locking lever to engage a tape cassette in said cassette holder means to press such cassette toward said transducer head.

5. The combination according to claim 4 wherein said plate means comprises a first plate slidably mounted in the housing and coupled with said platform means for movement therewith and a second plate slidably mounted on said first plate and movable therewith, with said locking lever pivotally mounted at said one end on said second plate.

6. The combination according to claim 5 further including means for limiting the extent of movement of said second plate to establish a predetermined maximum movement of said locking lever.

7. The combination according to claim 6 further including spring means resiliently interconnecting said first and second plates to maintain said plates in a first predetermined relationship until movement of said second plate is limited by said means for limiting movement of said second plate, whereupon said first plate moves relative to said second plate against the resilience of said spring means.

* * * * *